United States Patent
Keller et al.

(10) Patent No.: US 9,552,411 B2
(45) Date of Patent: Jan. 24, 2017

(54) TRENDING SUGGESTIONS

(71) Applicant: Microsoft Corporation, Redmond, WA (US)

(72) Inventors: Daniel Ethan Keller, Bellevue, WA (US); David A. Stevens, Sammamish, WA (US); Bryan Douglas Scott, Bothell, WA (US); David Earl Washington, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 413 days.

(21) Appl. No.: 13/910,135

(22) Filed: Jun. 5, 2013

(65) Prior Publication Data

US 2014/0365448 A1    Dec. 11, 2014

(51) Int. Cl.
*G06F 17/30* (2006.01)
*G06F 3/023* (2006.01)

(52) U.S. Cl.
CPC ......... *G06F 17/3064* (2013.01); *G06F 3/0237* (2013.01)

(58) Field of Classification Search
CPC . G06F 17/3064; G06F 17/3097; G06F 3/0237
USPC .......................... 707/705, 759, 765, 767, 692
See application file for complete search history.

(56) References Cited

U.S. PATENT DOCUMENTS

| | | | |
|---|---|---|---|
| 7,098,896 B2* | 8/2006 | Kushler | G06F 3/04883 345/168 |
| 8,473,293 B1* | 6/2013 | Mengibar | G10L 15/06 704/10 |
| 2005/0210017 A1 | 9/2005 | Cucerzan | |
| 2006/0190447 A1* | 8/2006 | Harmon et al. | 707/4 |
| 2008/0134282 A1* | 6/2008 | Fridman et al. | 726/1 |
| 2008/0243834 A1 | 10/2008 | Rieman et al. | |
| 2009/0119289 A1 | 5/2009 | Gibbs et al. | |
| 2010/0057687 A1 | 3/2010 | Shen et al. | |
| 2010/0114887 A1* | 5/2010 | Conway et al. | 707/737 |
| 2011/0035370 A1 | 2/2011 | Ortega et al. | |
| 2011/0320470 A1* | 12/2011 | Williams et al. | 707/767 |
| 2012/0166438 A1 | 6/2012 | Wu et al. | |
| 2012/0223889 A1* | 9/2012 | Medlock et al. | 345/168 |

(Continued)

OTHER PUBLICATIONS

Gao, et al.,"A Comparative Study of Bing Web N-gram Language Models for Web Search and Natural Language Processing", Retrieved at <<http://citeseerx.ist.psu.edu/viewdoc/download-?doi=10.1.1.175.85&rep=rep1 &type=pdf#page=16>>, In Proceedings of SIGIR, Jul. 19, 2010, pp. 6.

(Continued)

*Primary Examiner* — Hares Jami
(74) *Attorney, Agent, or Firm* — Aaron Chatterjee; Dan Choi; Micky Minhas

(57) ABSTRACT

Aspects of the subject matter described herein relate to paragraph snapping. In aspects, trending data is collected and prepared for sending to one or more target machines. Upon receiving the trending data, a target machines installs the trending data locally and deletes previously installed trending data. After installation, the trending data may be used to suggest text in response to input from a user. If a user selects suggested text, the text may be added to a local dictionary of the target machine.

19 Claims, 5 Drawing Sheets

(56) References Cited

U.S. PATENT DOCUMENTS

| | | |
|---|---|---|
| 2012/0265779 A1 | 10/2012 | Hsu et al. |
| 2012/0323828 A1 | 12/2012 | Sontag et al. |
| 2013/0046544 A1* | 2/2013 | Kay .................. G06F 3/04883 704/275 |
| 2013/0132434 A1* | 5/2013 | Scofield .............. G08G 1/0112 707/771 |

OTHER PUBLICATIONS

"SwiftKey", Retrieved at<<http://en.wikipedia.org/wiki/Swiftkey>>, May 3, 2013, pp. 4.

"International Search Report & Written Opinion for PCT Patent Application No. PCT/US2013/060764", Mailed Date: Jun. 13, 2014, Filed Date: Sep. 20, 2013, 10 Pages.

PCT Patent Application No. PCT/US2013/060764, Response to Written Opinion of the International Searching Authority including amended claims and marked-up copy of amended claims, dated Sep. 12, 2014, 14 pages.

"International Preliminary Report on Patentability Received for PCT Patent Application No. PCT/US2013/060764" (foreign counterpart application to U.S. Appl. No. 13/910,135), Mailed Date: Aug. 3, 2015, 9 Pages.

"Second Written Opinion Received for PCT Application No. PCT/US2013/060764" (foreign counterpart application to U.S. Appl. No. 13/910,135), Mailed Date: Nov. 17, 2014, 7 Pages.

Response to Second Written Opinion Received for PCT Application No. PCT/US2013/060764 (foreign counterpart application to U.S. Appl. No. 13/910,135), Mailed Date: Jan. 16, 2015, 8 Pages.

European Patent Application No. 13773980.01, Response to Communication Pursuant to Rules 161(1) and 162 EPC, dated Oct. 18, 2016, 4 pages.

\* cited by examiner

US 9,552,411 B2

TRENDING SUGGESTIONS

BACKGROUND

After a software product is produced, the product may be released with data that may be used, among other things, for suggesting text in response to input from a user. For example, with a touch sensitive screen or other input device, a user may begin inputting text. As the user types, words or phrases may be suggested to the user. A user may select a suggested word or phrase to have the word or phrase entered as input. Unfortunately, with the data available when released, the product may not be aware of recent words or phrases that have become popular since the product was released.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to providing trending suggestions. In aspects, trending data is collected and prepared for sending to one or more target machines. Upon receiving the trending data, a target machines installs the trending data locally and deletes previously installed trending data. After installation, the trending data may be used to suggest text in response to input from a user. If a user selects suggested text, the text may be added to a local dictionary of the target machine.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
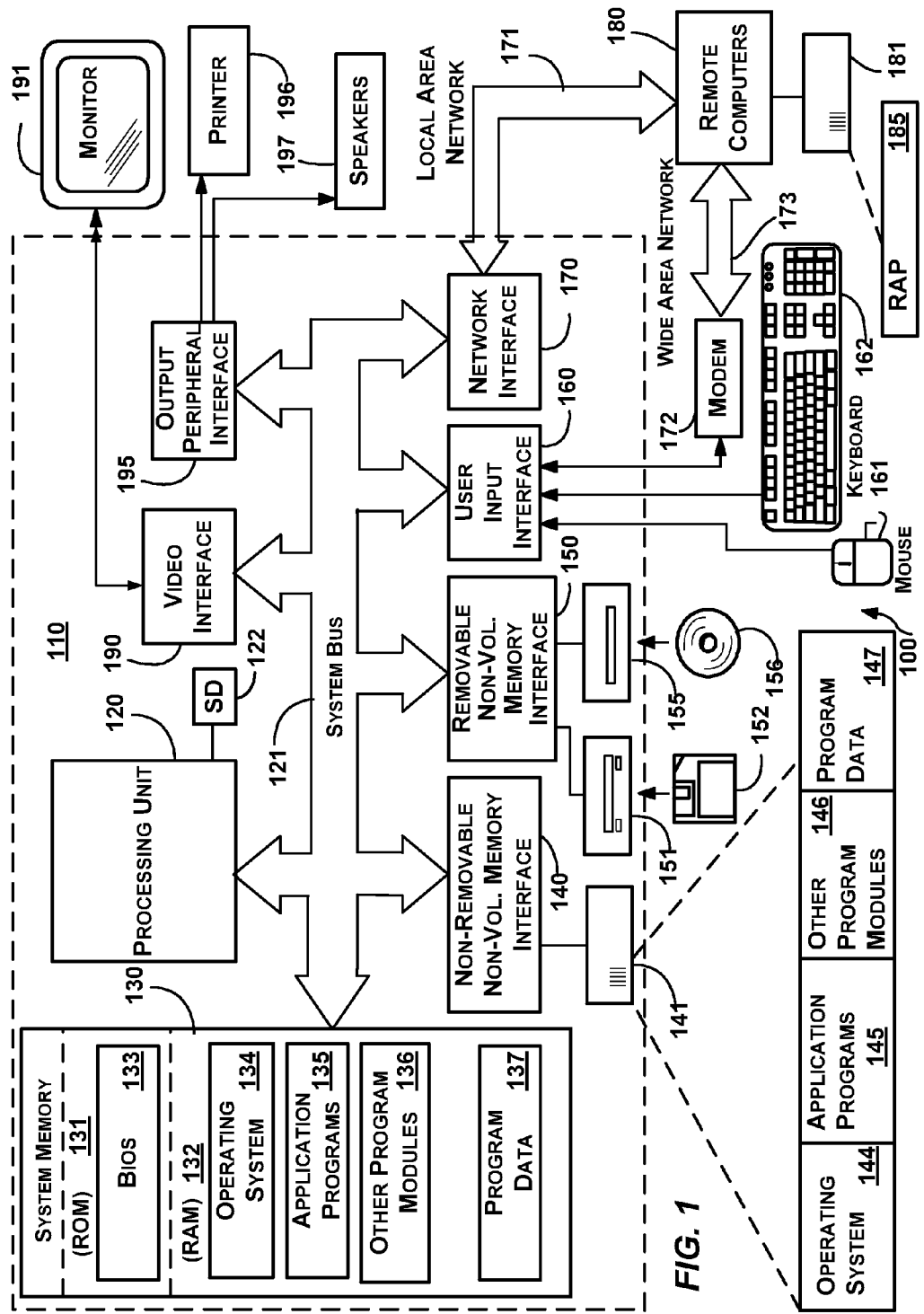
FIG. 1 is a block diagram representing an exemplary computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Trending

Figure 2:
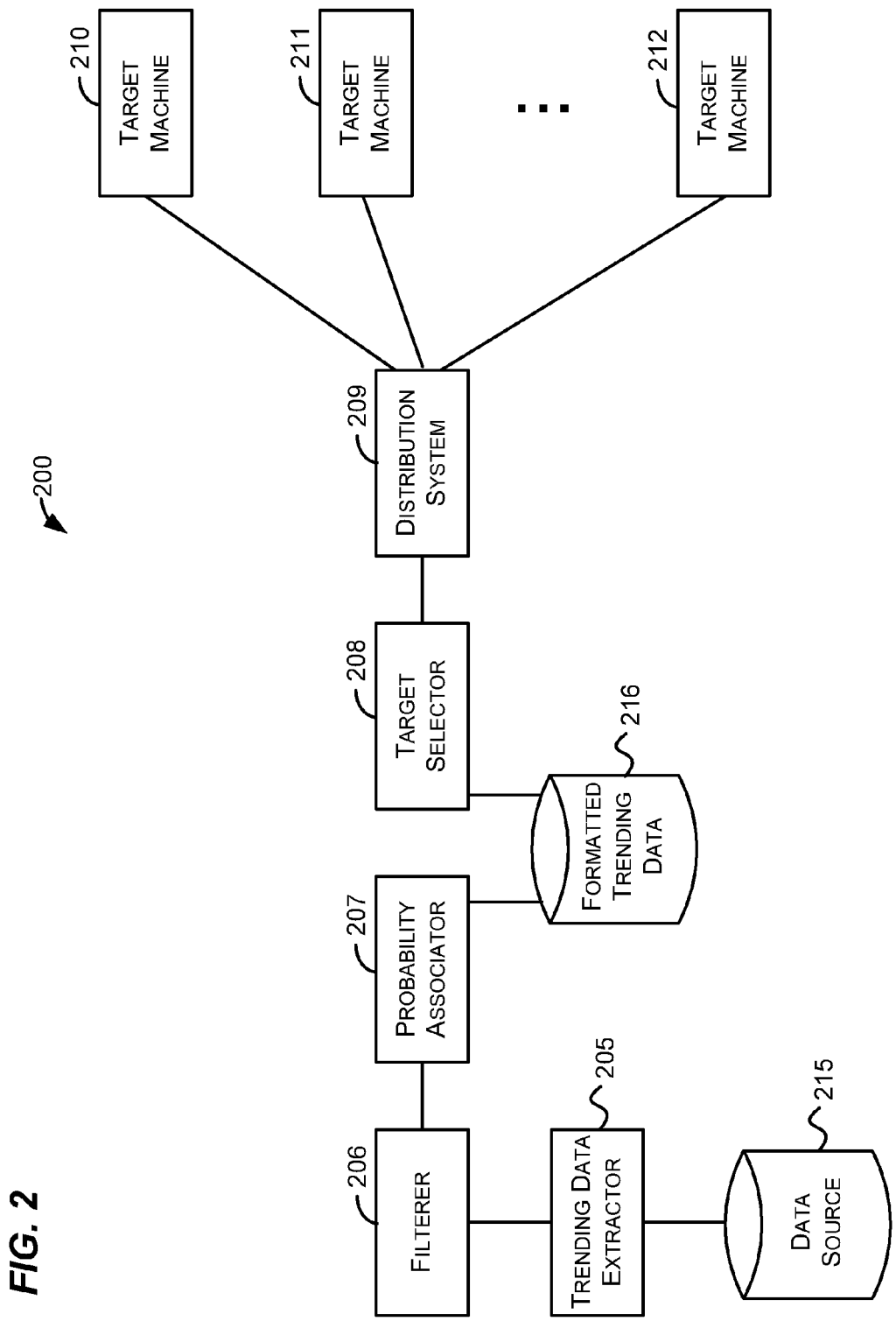
FIG. 2 is a block diagram that generally represents exemplary components of a system configured in accordance with aspects of the subject matter described herein.

As mentioned previously, suggestion data shipped with a released product may not include terms that have become popular since the product was released. FIG. 2 is a block diagram that generally represents exemplary components of a system configured in accordance with aspects of the subject matter described herein. The components illustrated in FIG. 2 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, or the like. In one implementation, a component may be implemented by programming a processor (e.g., the processing unit 120 of FIG. 1) to perform one or more actions.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Figure 3:
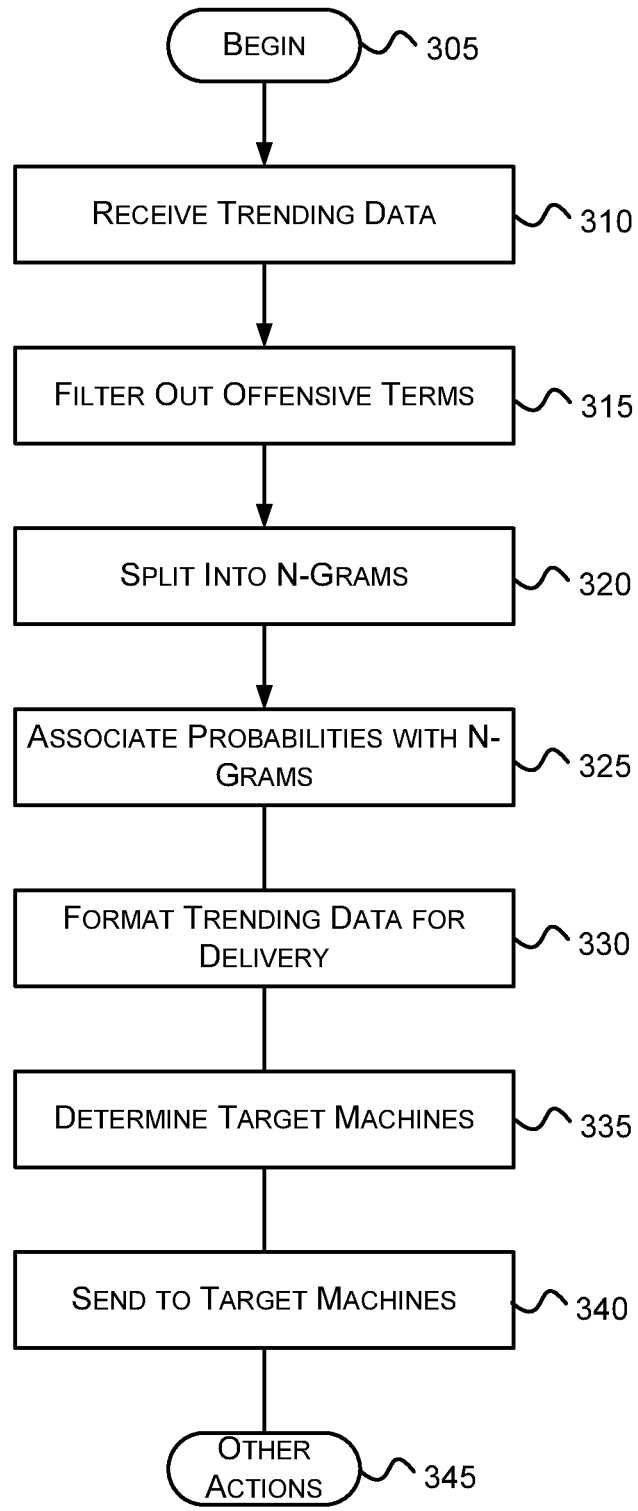
FIG. 3 is a flow diagram that generally represents actions that may be performed by the system of FIG. 2 in accordance with aspects of the subject matter described herein.

An exemplary device that may be configured to implement one or more of the components of FIGS. 2-3 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like. A service is another name for a process that may be executed on one or more computers.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

Turning to FIG. 2, the system 200 may include a trending data extractor 205, a filterer 206, a probability associator 207, a target selector 208, a distribution system 209, target machines 210-212, a data source 215, a data store 216, and may include other components (not shown).

In one implementation, the data source 215 is a source of trending data. For example, in one implementation, the data source 215 may include a search engine. The search engine may keep a record of queries it receives. In response to a request for trending data, the search engine may provide a number of most frequently received queries sent to the search engine over a period of time. The number may be specified to be greater than a configurable value.

Although a search engine is often described herein as providing trending data, trending data may also come from other sources, such as, for example, recent articles, news stories, or any other time specific text data.

Trending data may include, for example, one or more words or names that are frequently used over a period of time. For example, in one implementation, trending data may include the top N queries issued by users during a previous week subject to changes of frequency as described below.

What is classified as trending data may be based on changes of frequency of use of one or more words or names. For example, one or more words or names that are used relatively infrequently over a relatively long period of time may become relatively frequently used during a relatively short period of time. This may be used to determine that the one or more words or names are to be considered trending data. What is "relatively long" and what is "relatively short" may be a time period that is hard-wired, configurable, or computed based on a formula and may vary based on data source.

Trending data may be identified in other ways without departing from the spirit or scope of aspects of the subject matter described herein.

Names may include names of people, places, things, and the like. Words may include any text that is not a name. A phrase may include zero or more names and zero or more words as long as the phrase includes at least one name or at least one word.

In another implementation, the data source 215 may include other terms that are to be injected into suggestion databases of the target machines 210-212. For example, a company may come out with a new product that has a new name. To ensure that the new name is provided as a suggestion or included in a dictionary on the target machines 210-212, the company may provide the new name through the data source 215.

The data source 215 may be implemented in a variety of ways. For example, the data source 215 may be implemented as a database, one or more storage devices, a software service, another type of process, or the like.

If the data source 215 is implemented as a database, the data source 215 may comprise a relational database, an object-oriented database, a hierarchical database, a network database, another type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with a particular type of database may sometimes be used herein. Although particular database terminology may be used herein, the teachings herein may also be applied to other types of databases including those that have been mentioned previously.

In one embodiment, the data source 215 and the data store 216 may be implemented using any type of storage media capable of storing data. For example, devices implementing the data source 215 and the data store 216 may include volatile memory (e.g., a cache) and non-volatile memory (e.g., a persistent storage). The devices implementing the data source 215 and the data store 216 may be external, internal, or include some components that are internal and some components that are external to the machines hosting other components of the system 200.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The trending data extractor 205 may obtain trending data from the data source 215. In one implementation, the trending data extractor 205 may perform analysis to determine what data in the data source 215 is more frequently used over a period of time. In another implementation, the trending data extractor 205 may request trending data from the data source 215 and may supply one or more parameters to indicate how much trending data is desired (e.g., the top N queries for a specified time period).

After obtaining the trending data, the filterer 206 removes the offensive terms. Offensive terms may be indicated by a database that includes the terms. Offensive terms may include phrases (e.g., each phrase including at least one word and/or at least one name) that have been placed into the database.

After the offensive terms have been filtered, a probability associator 207 may split the trending data into n-grams and associate probabilities with each n-gram. An n-gram is a phrase that is a subset of another phrase. For example, in the phrase, "The red fox jumped," there are four 1-grams (e.g., "The", "red", "fox", "jumped"), three 2-grams (e.g., "The red", "red fox", "fox jumped"), two 3-grams (e.g., "The red fox", "red fox jumped"), and one 4-gram (e.g., "The red fox jumped").

Each of the n-grams of each phrase in the trending data may be associated with a probability (e.g., a number) that may be used to suggest the n-gram during using input.

The probability associator 207 may package the n-grams and probabilities into a data structure suitable for distribution to the target machines 210-212. This data structure may be stored in the data store 216 to use for distributing to the target machines 210-212.

The target selector 208 may determine a set of target machines (e.g., the target machines 210-212) to which to send the trending data. The target selector 208 may select target machines that have certain characteristics. Some exemplary characteristics include:

1. Whether a machine has a touch sensitive input device;
2. Whether a machine is installed with components for a particular language; and
3. Whether a machine is located in a certain geographical location.

The above characteristics are not intended to be all-inclusive or exhaustive of characteristics that may be used in determining the set of target machines. Indeed, based on the teachings herein, those skilled in the art may recognize many other characteristics that may be used in determining a set of target machines without departing from the spirit or scope of aspects of the subject matter described herein.

The target machines 210-212 may include any type of computing device mentioned herein. In one implementation, the target machines 210-212 may include machines that have touch sensitive screens with which input is entered into the machines but may not include machines that have other types of input (e.g., a keyboard, mouse, other input, or the like). In one implementation, the target machines 210-212 may include machines in which input is entered through the form of a stylus or other handwriting device. In another implementation, the target machines 210-212 may include machines that have various forms of input including touch sensitive screens, styluses, keyboards, mice, voice input, and the like.

After the target machines 210-212 are determined, the distribution system 209 may send the trending data to the target machines 210-212. In one implementation, sending may take the form of an update to components of the target machines 210-212.

The process engaged in by the system 200 may be repeated at pre-defined or configurable intervals or at other times.

Figure 4:
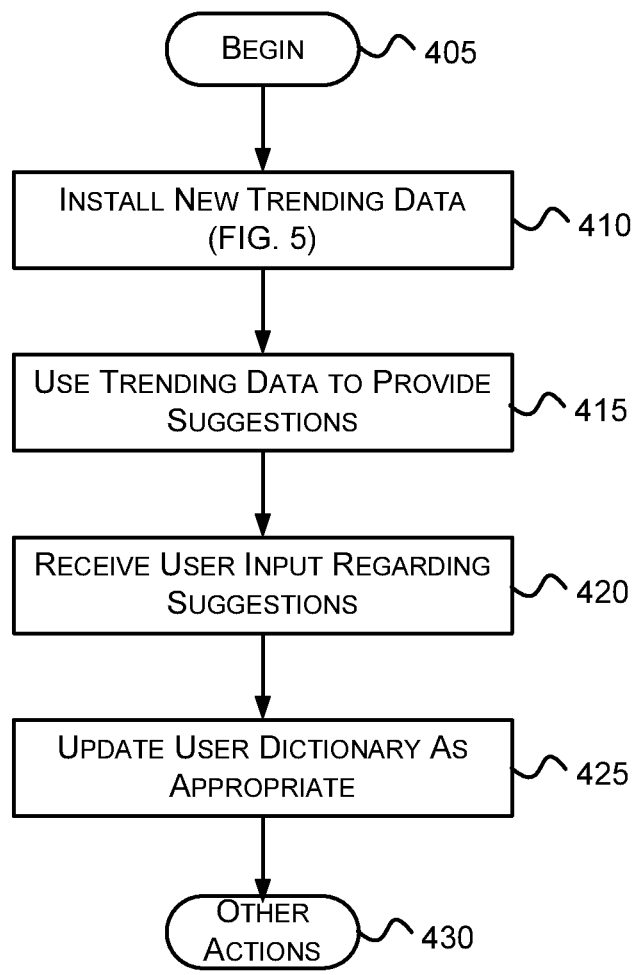
FIGS. 4-5 are flow diagrams that generally represent actions that may be performed on a target machine in accordance with aspects of the subject matter described herein.
Figure 5:
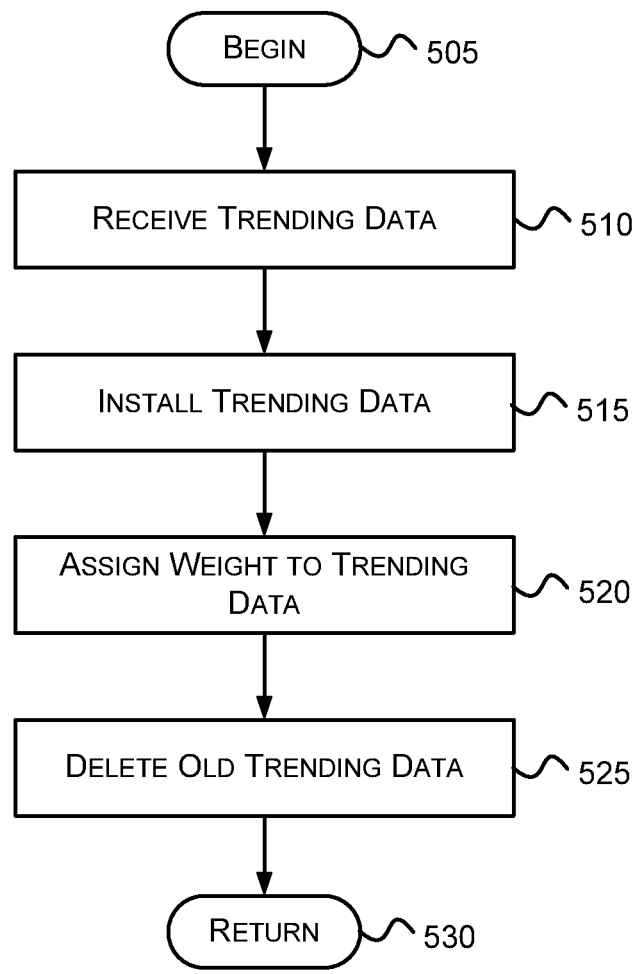

FIGS. 3-5 are flow diagrams that generally represent exemplary actions that may occur in accordance with aspects of the subject matter described herein. For simplicity of explanation, the methodology described in conjunction with FIGS. 3-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 3 is a flow diagram that generally represents actions that may be performed by the system of FIG. 2 in accordance with aspects of the subject matter described herein. At block 305, the actions begin.

At block 310, trending data is received that includes a set of phrases to be used for text suggestions. For example, referring to FIG. 2, the trending data extractor 205 may receive trending data from the data source 215. The trending data may include a set of phrases to be used for text suggestions.

A phrase may include one or more new words, new terms, new names, or the like. The term "new" in this context may include words, terms, and names that are entirely new (e.g., first coming to existence). For the case of a term, a "new term" includes a combination of words and/or names where the combination is new while the words and/or names are not necessarily new. In addition, the terms new words, new names, and new terms may include words, names, and terms, respectively, that are old but that have increased in popularity sufficient to be classified as trending data.

At block 315, offensive terms are filtered out of the trending data. For example, referring to FIG. 2, the filterer 206 may remove offensive terms that are indicated by an offensive terms database (not shown).

At block 320, the trending data may be split into n-grams. For example, referring to FIG. 2, the probability associator 207 (or another component) may split phrases of the trending data into n-grams.

At block 325, probabilities are associated with each of the n-grams. For example, referring to FIG. 2, the probability associator 207 may associate a probability with each of the n-grams.

At block 330, the trending data is formatted for delivery to target machines. For example, referring to FIG. 2, the n-grams and probability data may be packaged into a trending data structure and stored in the data store 216. A trending data structure may include, for example, a collection of phrases and probabilities. As another example, a trending data structure may include data formatted according to a database structure. The trending data structure may also include other data associated with the trending data. The trending data structure may be derived from the trending data through one or more of the actions described above.

At block 335, target machines may be determined. For example, referring to FIG. 2, the target selector 208 may select a set of target machines (e.g., the target machines 210-212) based on one or more characteristics as described previously.

At block 340, the trending data structure is sent to the target machines. For example, referring to FIG. 2, the distribution system 209 may distribute the trending data structure to the target machines 210-212.

At block 345, other actions, if any, may be performed.

FIGS. 4-5 are flow diagrams that generally represent actions that may be performed on a target machine in accordance with aspects of the subject matter described herein. At block 405, the actions begin.

At block 410, new trending data is installed as described in more detail in conjunction with FIG. 5.

At block 415, the trending data is used to provide suggestions. For example, referring to FIG. 2, in response to user input (e.g., a few characters or words), the target machine 210 may provide a suggestion of a phrase using trending data installed on the target machine 210.

At block 420, user input is received regarding a suggestion. For example, referring to FIG. 2, a user may use a touch sensitive screen to select the suggestion provided from the trending data.

At block 425, a user dictionary is updated as appropriate. For example, referring to FIG. 2, a spelling dictionary that resides on the target machine 210 may be updated to include one or more words of the suggestion selected by the user. The one or more words added to the spelling dictionary may be indicated as being correctly spelled words. The words added to the spelling dictionary may be retained even after the trending data is deleted from the target machine 210.

Note, this may be different behavior than what occurs when the users types a new word without using a suggestion. For example, even if a user types "teh" (even if done on several different occasions), a machine may not add "teh" to the machine's spelling dictionary. On the other hand, if the user selects a suggestion that includes previously unknown words, these words may be added to the machine's spelling dictionary and indicated as correctly spelled as they came from a suggestion.

At block 430, other actions, if any, may be performed.

Turning to FIG. 5, at block 505, the actions begin. At block 510, trending data is received. The trending data includes a set of phrases to be used for text suggestions and potentially for correction of misspelled text. For example, referring to FIG. 2, the target machine 211 may receive trending data from the distribution system 209.

At block 515, the trending data is installed as a new dataset of a target machine. For example, the trending data may be installed on the target machine 211. The target machine 211 may also have a local dataset that includes terms that have been inputted (e.g., typed in, selected, or the like) by user input on the target machine. Installing the trending data on a target machine makes the trending data available to use in providing suggestions in response to user input received on the target machine.

At block 520, a weight is assigned to the new dataset of trending data. The weight assigned is less than a weight given to the local dataset. One reason for this is that suggestions from the local dataset are to be provided before suggestions from the trending dataset. Thus, if a user has indicated certain phrases that are included in the local dataset and begins entering text that may be equally close to a phrase in the local dataset and a phrase in the trending dataset, the phrase in the local dataset may be suggested before the phrase in the trending dataset.

At block 525, old trending data is deleted. For example, referring to FIG. 2, in conjunction with installing a new trending dataset, the target machine 211 may delete a previously installed trending dataset. Deleting a previously installed trending dataset does not delete phrases that have been added to the local dataset.

At block 530, the actions may continue at block 415 of FIG. 4.

The processing unit 120 of FIG. 1 may be programmed through computer-executable instructions to perform the actions indicated above. The monitor 191, printer 196, speakers 197, or other output device may be used to provide a representation (e.g., graphics on a screen, text on a printer, sound from speakers, or the like) of suggestions.

As can be seen from the foregoing detailed description, aspects have been described related to paragraph snapping. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

in response to receiving user input from an input device of a client device, providing one or more text suggestions from a first dataset, the first dataset and a second dataset including a respective set of phrases to be used for text suggestions and stored at the client device, the user input including a character, the first dataset comprising trending data, the second dataset different from the first dataset, the second dataset comprising phrases that have been inputted by user input on the client device;

in response to the user selecting one of the text suggestions from the first dataset from the input device of the client device, adding the selected text suggestion to the second dataset;

in response to receiving a new first dataset from a service, deleting the first dataset from the client device; and assigning the new first dataset a weight that is less than a weight assigned to the second dataset such that suggestions from the new first dataset are suggested after higher weighted suggestions available from the second dataset when the suggestions from the second dataset and the suggestions from the new first dataset are equally probable.

2. The method of claim 1, further comprising:

adding one or more words of the selected text suggestion to a spelling dictionary of the client such that the one or more words are indicated as correctly spelled words.

3. The method of claim 2, further comprising maintaining the one or more words on the client for use in providing suggestions and spelling correction even after the first dataset is deleted.

4. The method of claim 1, wherein new first datasets are received at pre-defined intervals.

5. The method of claim 1, wherein the first dataset is derived from queries issued to a search engine.

6. The method of claim 5, wherein the first dataset represents queries that have been submitted to the search engine with a higher frequency compared to other queries submitted to the search engine over a period of time.

7. The method of claim 1, wherein at least one of the phrases includes a new term.

8. The method of claim 1, wherein at least one of the phrases includes a new word.

9. The method of claim 1, wherein at least one of the phrases includes a new name.

10. The method of claim 1, wherein the first dataset includes sets of n-grams, wherein each n-gram is associated with a probability to use in suggesting the n-gram.

11. The method of claim 1, wherein the first dataset is received from the service that performs actions, the actions comprising:

determining a set of target machines to which to send a trending data structure derived from the trending data; and sending the trending data structure to the set of target machines as the first dataset.

12. A computer storage medium having computer-executable instructions, which when executed perform actions, comprising:
   receiving trending data that includes a set of phrases to be used for text suggestions and for correction of misspelled text;
   filtering the trending data to remove offensive phrases that are indicated by an offensive terms database, each offensive phrase including at least one word and/or at least one name;
   determining a set of target machines to which to send a trending data structure derived from the trending data based upon a determination that the set of target machines are within a certain geographical area;
   sending the trending data structure to the set of target machines;
   installing the trending data in a new dataset of the client, the client including a local dataset that includes terms that have been inputted on the client; and
   assigning the new dataset a weight that is less than a weight assigned to the local dataset such that suggestions from the new dataset are suggested after higher weighted suggestions available from the local dataset when the suggestions from the local dataset and the suggestions from the new dataset are equally probable.

13. The computer storage medium of claim 12, further comprising:
   splitting the phrases in the trending data into n-grams;
   for each of the n-grams, associating a probability;
   packaging the n-grams and probability data into the trending data structure.

14. The computer storage medium of claim 12, further comprising formatting the trending data.

15. The computer storage medium of claim 12, wherein receiving trending data comprises receiving a dataset that includes a number of most frequently received queries sent to a search engine over a period of time, the number greater than a configurable value.

16. The computer storage medium of claim 12, wherein sending the trending data to the set of target machines comprises sending the trending data to a client that performs actions, the actions comprising:
   receiving the trending data;
   deleting, from the client, an old dataset that includes previous trending data.

17. The computer storage medium of claim 12, wherein determining a set of target machines further comprises determining a set of machines that have touch sensitive input devices.

18. In a computing environment, a system, comprising:
   a memory structured to store datasets;
   an output device structured to provide a representation of suggestions obtained from the datasets in response to text input; and
   a processor coupled to the memory and the output device, the processor programmed to perform actions, the actions comprising:
      in response to receiving user input from an input device of a client device, providing one or more text suggestions from a first dataset, the first dataset and a second dataset including a respective set of phrases to be used for text suggestions and stored at the client device, the user input including a character, the second dataset different from the first dataset;
      in response to the user selecting one of the text suggestions from the first dataset from the input device of the client device, adding the selected text suggestion to the second dataset;
      in response to receiving a new first dataset from a service, deleting the first dataset from the client device; and
      assigning the new first dataset a weight that is less than a weight assigned to the second dataset such that suggestions from the new first dataset are suggested after higher weighted suggestions available from the second dataset when the suggestions from the second dataset and the suggestions from the new first dataset are equally probable.

19. The system of claim 18, wherein the output device comprises a touch sensitive screen structured to receive the text input.

* * * * *